Figure 1:
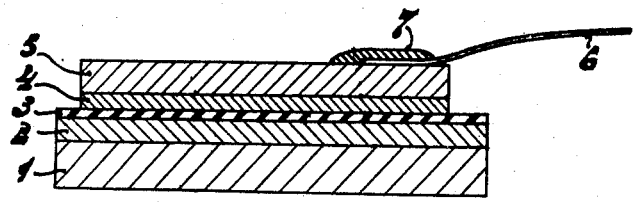

March 29, 1949.  W. C. VAN GEEL ET AL  2,465,768
BLOCKING-LAYER CELL

Filed Sept. 18, 1945  2 Sheets-Sheet 1

INVENTORS
WILLEM CHRISTIAAN VAN GEEL
JOHANNES JACOBUS ASUERUS PLOOS VAN AMSTEL
BY
ATTORNEY

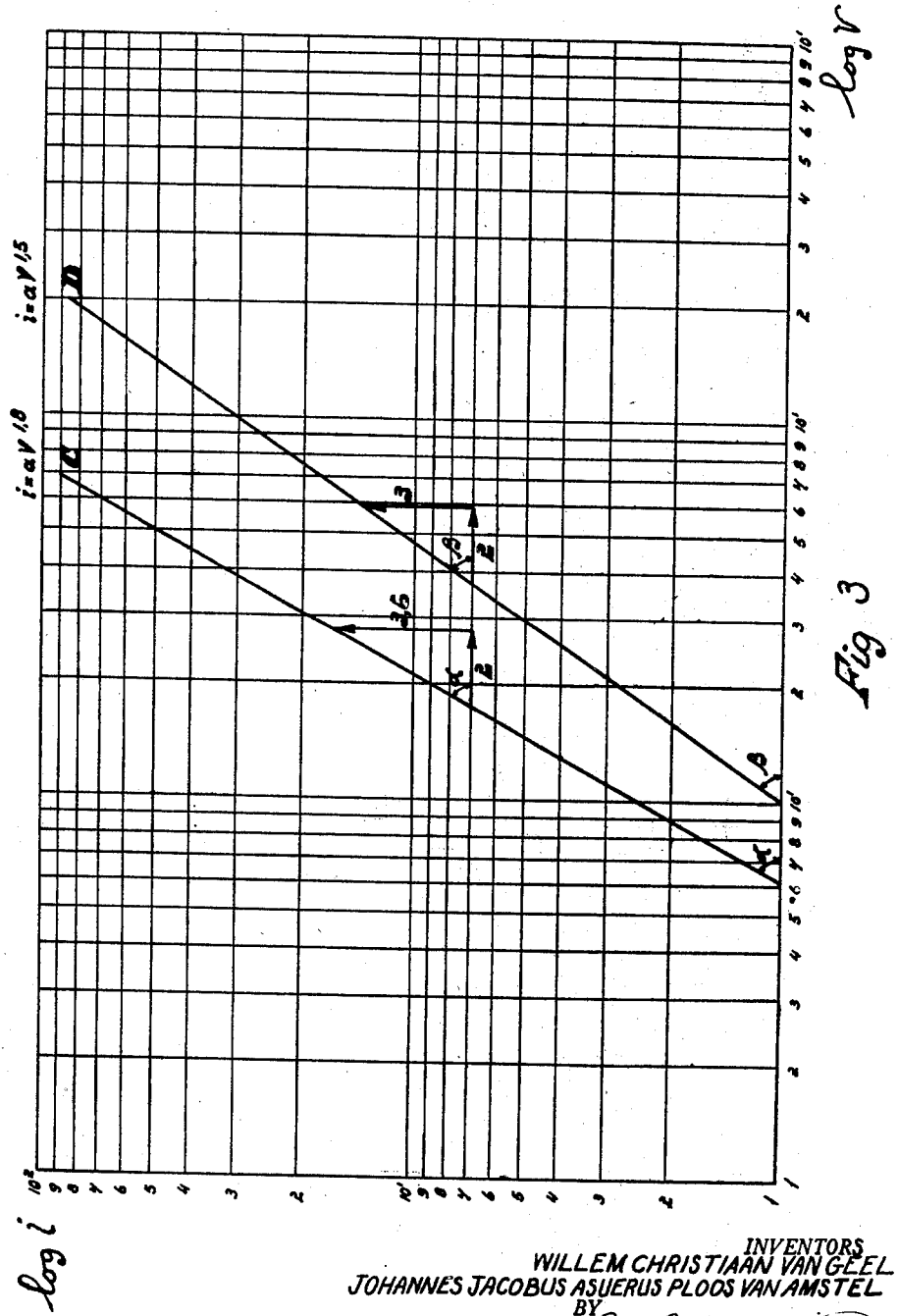

Patented Mar. 29, 1949

2,465,768

UNITED STATES PATENT OFFICE 2,465,768

BLOCKING-LAYER CELL

Willem Christiaan van Geel and Johannes Jacobus Asuerus Ploos van Amstel, Eindhoven, Netherlands, assignors to Hartford National Bank & Trust Co., Hartford, Conn., as trustee Application September 18, 1945, Serial No. 617,161
In the Netherlands June 26, 1941

Section 1, Public Law 690, August 8, 1946
Patent expires June 26, 1961

9 Claims. (Cl. 175—366)

The invention relates to a blocking-layer cell, more particularly, for rectifying currents in the low-voltage region in measuring circuit-arrangements, which cell comprises a semi-conductive electrode having on it a blocking layer and a metal layer provided on the other side of the blocking layer.

The known blocking-layer cells, wherein the conductive electrode, also referred to as "counter electrode," consists of a metal are preferred for various applications such as industrial rectifiers owing to the fact that at the usual voltages they allow the passage of a heavy current. They involve, however, the drawback that for the voltage applied there exists a certain threshold value below which substantially no current is passed and above which the current initially increases very slightly. This is a drawback in those cases wherein operation takes place just at very low voltages, for example of from 0.5 to 1 volt. Such cases occur in measuring circuit arrangements, that is to say where an alternating voltage is measured by a direct current ammeter. The fact that the deflection of such a meter is determined by the current passing through it, results in that with the use of ordinary rectifiers the meter exhibits no deflection or an extremely slight deflection at the lowest voltages and an unproportionally large deflection at the high voltages. This may be expressed by the change in the relation between current and voltage, i. e. the quotient:

$$\frac{di}{dV}$$

The invention has for its object to provide means by which this drawback is obviated.

The invention is characterized in that between the metal layer and the blocking layer there is a boundary layer which has a lower electrical conductivity than the rest of the metal layer but possesses so high a conductivity that the boundary layer does not form part of the blocking layer.

It has been found that blocking-layer cells according to the invention exhibit an appreciably more constant course of $$\frac{di}{dV}$$

Blocking-layer cells according to the invention have the further advantage that they can be manufactured so as to be reproducible in a simple and easily verifiable manner.

The counter electrode proper of these cells is formed by the boundary layer whilst the further metal serves for the supply of current to this electrode.

The cell is preferably built up in such manner that the boundary layer consists of a chemical compound of the material of the metal layer.

More particularly in this way it is possible to form the electrode itself, i. e. the boundary layer, in a simple manner whilst in the same time an intimate connection between the metal and the material of the boundary layer is established, for it is possible to start from the metal and to convert the latter superficially by chemical reaction into a semi-conductive compound of the metal. The boundary layer may be given in this case so small a thickness that this layer acts as an electrode, it is true, but that on the other hand the resistance in the cell is not increased to an extent worth-mentioning.

Different precious metals may be utilized for the purpose in view, in which event a boundary layer is formed which is a semi-conductive chemical compound of this material.

A metal which is excellently suitable for being utilized as the counter electrode is gold, in which event the boundary layer consists of a semi-conductive compound of gold.

A preferred method of applying such an electrode consists in that in an atmosphere containing oxygen gold is applied to the blocking layer by vaporisation or by sputtering.

It is also possible that in the formation of the counter electrode the starting-point is formed by copper on which a boundary layer of cuprous iodide is formed.

It is also advantageous to utilize lead which exhibits a boundary layer of lead sulphide.

It may be observed that all the above-mentioned materials (gold, copper and lead) can be easily converted into the above-mentioned compounds which are all of them known as semi-conductors and which form, in combination with other semi-conductors having a lower emissive capacity, a suitable blocking-layer cell, more particularly for the above-described purpose.

One embodiment of a blocking-layer cell according to the invention will be described hereinafter, the manufacture of the cell being broadly outlined. All this is explained with reference to the accompanying drawing wherein Fig. 1 represents diagrammatically a sectional view of the cell; it may be observed that for the sake of clearness the proportions of the thickness are different from the real proportions.

Figure 2:
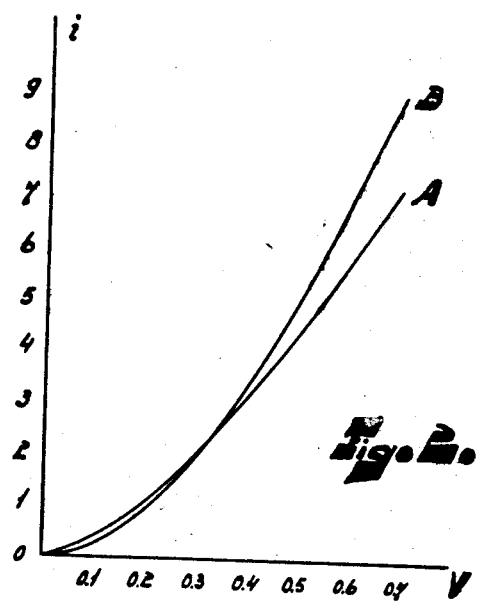

Fig. 2 represents the current-voltage characteristic curves of an ordinary cell having a metal electrode and of a cell according to the invention respectively.

Fig. 3 likewise represents comparative characteristic curves, however, to a double-logarithmical scale, from which appears the slope and the exponent in the equation of the current-voltage dependence.

A layer of selenium 2 is applied in known manner to a metal support 1 which consists, for example, of aluminium. On the upper surface of the layer of selenium is formed a blocking layer 3. The counter electrode consists of a cuprous iodide layer 4 which has been formed, for example, from copper by iodinating a copper layer applied by vaporisation to the blocking layer. On the layer of cuprous iodide bears a copper layer 5 which has also been applied by vaporisation. The system is consequently formed by the selenium layer, which acts as the semi-conductive electrode (anode), and by the layer of cuprous iodide (cathode), these two layers being separated from one another by the blocking layer. The metal layer 5 acts as a current supply conductor for the cuprous iodide electrode. In order to render possible the connection of the cell to an external circuit a wire- or strip-shaped member 6 may be soldered at 7 to the metal layer 5.

The current-voltage characteristic curve of the cell according to the invention is represented by curve A in Fig. 2. Comparison with curve B of an ordinary cell (formed in the same manner but having a copper electrode) teaches that in the region of comparatively low voltages, which consequently enter in the first place into account for meters, the output current of the cell according to the invention is for a determined voltage of higher intensity than that of the known cell. Upon considering the current at 0.1 volt its intensity is found to be for A upwards of 2 and for B 4 units, or conversely if the complete deflection of a meter requires 0.2 current units a voltage of only 0.06 volt is required for A whereas for B a voltage of 0.1 volt, i. e. almost the double amount, is necessary.

It should be pointed out that the current is not indicated in ordinary current units, for example milliamperes, since two cells of the above-described type and of the same dimensions do not yield comparable characteristic curves. The values of the current have therefore been converted into comparable values which can be represented in the characteristic curves, for at a determined voltage in the region of the comparatively high voltages the current is in a cell according to the invention of lower intensity than in an ordinary cell having a metal counter electrode. The principal thing in such a comparison is, however, the ratio between current and voltage at different voltages or in other words the shape of the current-voltage characteristic curve, for the more closely the latter approaches a straight line the less is the deformation and the more regular is the division of the scale of this meter with which the cell co-operates.

The characteristic curves in Fig. 3, which are plotted to a double-logarithmical scale, afford a clear insight into the value of a curve for the current-voltage dependence.

Curve C shows the dependence for a cell whose electrodes consist, on the one hand, of selenium and, on the other hand, of copper whereas curve D applies to a cell comprising electrodes of selenium and cuprous iodide with an outer layer of copper. By measurements taken in the figure it is found that the slope of curve $$Ctg\alpha = \frac{\log di_1}{\log dV_1} = 1.8$$

and that the slope of curve $$D = tg.B = \frac{\log di_2}{\log dV_2} = 1.5$$

which involves in the formula for the current-voltage dependence:

$$i = nV^p$$

that $p_1 = 1.8$ and that $p_2$ is only 1.5.

The deformation of the curve, when plotted linearly, becomes such as in Fig. 2 and the deformation of the scale on the meter is therefore in case C much more unfavourable than in case D.

What we claim is:

1. A blocking layer cell for rectifying currents at low voltages comprising a semi-conductive electrode, a blocking layer on said semi-conductive electrode, a conductive metal layer electrode, and a semi-conductive bi-directional layer of higher conductivity than said blocking layer interposed between said blocking layer and said conductive metal layer electrode.

2. A blocking layer cell for rectifying currents at low voltages comprising a semi-conductive electrode, a blocking layer on said semi-conductive electrode, a conductive metal layer electrode, and a semi-conductive bi-directional boundary layer of higher conductivity than said blocking layer consisting of a chemical compound of the metal of said conductive electrode interposed between said blocking layer and said conductive electrode.

3. A blocking layer cell for rectifying currents at low voltages comprising a semi-conductive electrode, a blocking layer on said semi-conductive electrode, a conductive electrode consisting of a layer of precious metal, and a semi-conductive bi-directional boundary layer of higher conductivity than said blocking layer consisting of a chemical compound of said precious metal interposed between said blocking layer and said conductive electrode.

4. A blocking layer cell for rectifying currents at low voltages comprising a semi conductive electrode, a blocking layer on said semi-conductive electrode, a gold layer electrode, and a bi-directional boundary layer of higher conductivity than said blocking layer consisting of a semi-conductive compound of gold interposed between said blocking layer and said gold electrode.

5. A blocking layer cell for rectifying currents at low voltages comprising a semi-conductive electrode, a blocking layer on said semi-conductive electrode, a lead layer electrode, and a bi-directional boundary layer having a higher conductivity than said blocking layer consisting of lead sulfide interposed between said blocking layer and said lead electrode.

6. A blocking layer cell for rectifying currents at low voltages comprising a semi-conductive electrode, a blocking layer on said semi-conductive electrode, a copper layer electrode, and a semi-conductive bi-directional boundary layer having a higher conductivity than said blocking layer consisting of cuprous iodide interposed between said blocking layer and said copper layer electrode.

7. The method of manufacturing a blocking layer cell for rectifying currents at low voltages comprising the steps of, forming a blocking layer on a semi-conductive electrode, depositing a metallic layer on said blocking layer, forming a semi-conducting bi-directional boundary layer from said metallic layer on said blocking layer, and depositing a metallic conducing electrode on said boundary layer.

8. The method of manufacturing a blocking layer cell for rectifying currents at low voltages comprising the steps of forming a blocking layer on a semi-conductive electrode, vaporizing gold in an oxygen containing atmosphere to form a semi-conductive bi-directional boundary layer on said blocking layer, and depositing a layer of gold on said boundary layer.

9. The method of manufacturing a blocking layer cell for rectifying currents at low voltages comprising the steps of, forming a blocking layer on a semi-conductive electrode, sputtering gold in an oxygen containing atmosphere to form a semi-conductive bi-directional boundary layer on said blocking layer, and depositing a layer of gold on said boundary layer.

WILLEM CHRISTIAAN VAN GEEL.
JOHANNES JACOBUS
    ASUERUS PLOOS VAN AMSTEL.

REFERENCES CITED

The following references are of record in the file of this patent:

UNITED STATES PATENTS

| Number | Name | Date |
|---|---|---|
| 1,955,397 | Van Geel | Apr. 17, 1934 |
| 1,986,582 | Jones | Jan. 1, 1935 |
| 2,002,221 | Van Geel | May 21, 1935 |
| 2,173,249 | De Baer | Sept. 19, 1939 |
| 2,215,999 | Brunke | Sept. 24, 1940 |
| 2,328,440 | Esseling | Aug. 31, 1940 |